(12) United States Patent
Sumino et al.

(10) Patent No.: US 9,828,545 B2
(45) Date of Patent: Nov. 28, 2017

(54) (OXY)NITRIDE PHOSPHOR POWDER AND METHOD OF PRODUCING SAME

(71) Applicant: UBE Industries, Inc., Ube (JP)

(72) Inventors: Mao Sumino, Ube (JP); Kazuki Iwashita, Ube (JP); Takuma Sakai, Ube (JP); Masataka Fujinaga, Ube (JP); Shinsuke Jida, Ube (JP)

(73) Assignee: Ube Industries, Ltd. (JP)

( * ) Notice: Subject to any disclaimer, the term of this patent is extended or adjusted under 35 U.S.C. 154(b) by 177 days.

(21) Appl. No.: 14/781,132

(22) PCT Filed: Mar. 28, 2014

(86) PCT No.: PCT/JP2014/059340
§ 371 (c)(1),
(2) Date: Sep. 29, 2015

(87) PCT Pub. No.: WO2014/157695
PCT Pub. Date: Oct. 2, 2014

(65) Prior Publication Data
US 2016/0060516 A1 Mar. 3, 2016

(30) Foreign Application Priority Data

Mar. 29, 2013 (JP) .................. 2013-073261

(51) Int. Cl.
*C09K 11/64* (2006.01)
*C09K 11/08* (2006.01)
(Continued)

(52) U.S. Cl.
CPC .......... *C09K 11/7734* (2013.01); *C01B 21/06* (2013.01)

(58) Field of Classification Search
CPC ..................... C09K 11/7734; C01B 21/06
See application file for complete search history.

(56) References Cited

U.S. PATENT DOCUMENTS 7,074,346 B2 * 7/2006 Yamada ............... C04B 35/597
 252/301.4 F
9,023,240 B2 * 5/2015 Fujinaga ............. C01B 21/0602
 252/301.4 F
(Continued)

FOREIGN PATENT DOCUMENTS

JP 2005-008794 1/2005
JP 2005-307012 11/2005
(Continued)

OTHER PUBLICATIONS

"Study on Production of Rare Earth Element-Doped α-SiAlON Light Conversion Material for White Light-Emitting Diode and Light-Emitting Performance Thereof," published Oct. 29, 2010, along with an English abstract (9 pages total).
(Continued)

*Primary Examiner* — Carol M Koslow
(74) *Attorney, Agent, or Firm* — DLA Piper LLP (US)

(57) ABSTRACT

An (oxy)nitride phosphor powder has a fluorescence peak wavelength of 610 to 625 nm and also has higher external quantum efficiency than the conventional one. The (oxy)nitride phosphor powder includes an α-type SiAlON and aluminum nitride, represented by the compositional formula: $Ca_{x1}Eu_{x2}Si_{12-(y+z)}Al_{(y+z)}O_zN_{16-z}$ wherein x1, x2, y, z fulfill the following formulae: $1.60 \leq x1+x2 \leq 2.90$, $0.18 \leq x2/x1 \leq 0.70$, $4.0 \leq y \leq 6.5$, $0.0 \leq z \leq 1.0$. The powder can additionally contain Li in an amount of 50 to 10000 ppm. The content of the aluminum nitride may be more than 0 mass % to less than 33 mass %.

9 Claims, 2 Drawing Sheets

(51) Int. Cl.
*C09K 11/77* (2006.01)
*C01B 21/06* (2006.01)

(56) References Cited

U.S. PATENT DOCUMENTS

| | | | | |
|---|---|---|---|---|
| 9,023,241 | B2* | 5/2015 | Fujinaga | C01B 21/068 252/301.4 F |
| 2003/0030038 | A1 | 2/2003 | Mitomo et al. | |
| 2009/0284948 | A1* | 11/2009 | Yamao | C04B 35/597 362/84 |
| 2010/0208481 | A1 | 8/2010 | Miyake et al. | |
| 2013/0001815 | A1* | 1/2013 | Yamao | C04B 35/597 264/21 |
| 2013/0153824 | A1 | 6/2013 | Fujinaga et al. | |

FOREIGN PATENT DOCUMENTS

| | | |
|---|---|---|
| JP | 2009-096882 | 5/2009 |
| JP | 2009-96883 | 5/2009 |
| JP | 2012-224757 | 11/2012 |
| WO | 2012/023414 | 2/2012 |
| WO | WO 2012/017949 * | 2/2012 |
| WO | WO 2012/023414 * | 2/2012 |

OTHER PUBLICATIONS

Supplementary European Search Report dated Jan. 3, 2017, corresponding to European Application No. 14773089.9.

Rong-Jun, Xie et al., "Optical Properties of Eu2+ in α-SiAlON," *Journal of Physical Chemistry*, B (online), (Jan. 1, 2004), vol. 108, No. 32, pp. 12027-12031.

Yang Jian-Jun et al., "The crystal structure and luminescent properties of nitrogen-rich Ca-α-sialon:Eu with saturated calcium solubility fabricated by the alloy-nitridation method," *Chinese Physics*, B, vol. 21, No. 7 (Jul. 9, 2012), pp. 077802 (1-8).

* cited by examiner

(OXY)NITRIDE PHOSPHOR POWDER AND METHOD OF PRODUCING SAME

TECHNICAL FIELD

The present invention relates to an (oxy)nitride phosphor powder containing, as a main component, an α-SiAlON activated with a rare earth metal element, which is suitable for an ultraviolet to blue light source, and a production method thereof. More specifically, the present invention relates to an (oxy)nitride phosphor powder having a fluorescence peak wavelength of 610 to 625 nm and exhibiting practical external quantum efficiency and fluorescence intensity.

BACKGROUND ART

Recently, with practical implementation of a blue light-emitting diode (LED), development of a white LED using this blue LED is being aggressively pursued. The white LED ensures low power consumption and extended life compared with existing white light sources and therefore, its application to liquid crystal panel backlight, indoor or outdoor lighting devices, etc., is expanding.

A white LED developed at present is obtained by applying a Ce-doped YAG (yttrium-aluminum garnet) onto the surface of a blue LED. However, the fluorescence peak wavelength of Ce-doped YAG is in the vicinity of 560 nm and when this fluorescence color and the light of blue LED are mixed to produce white light, the white light is slightly blue-tinted. Thus, this kind of white LED has a problem of bad color rendering.

To cope with this problem, many (oxy)nitride phosphors are being studied and among others, an Eu-activated α-SiAlON phosphor is known to emit fluorescence (from yellow to orange) with a peak wavelength of around 580 nm that is longer than the fluorescence peak wavelength of Ce-doped YAG (see, Patent Document 1). When a white LED is fabricated by using the α-SiAlON phosphor above or by combining it with a Ce-doped YAG phosphor, a white LED giving a bulb color with a lower color temperature than a white LED using only Ce-doped YAG can be produced.

Furthermore, a white LED having good color rendering property and good color reproducibility is demanded, and development of a white LED combining a green phosphor and a red phosphor with a blue LED is being pursued. However, since the light emitted by the existing red phosphor contains a large amount of light of 700 nm or more, there is a problem that the luminous efficiency deteriorates. On this account, a phosphor that emits an orange to red fluorescence having a peak wavelength of approximately from 600 to 630 nm is required as the red phosphor.

With respect to the Ca-containing α-SiAlON phosphor activated with Eu, represented by the formula:

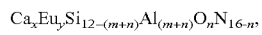

$Ca_xEu_ySi_{12-(m+n)}Al_{(m+n)}O_nN_{16-n}$, only a phosphor emitting a fluorescence having a peak wavelength of 580 to 605 nm has been developed as a phosphor with high luminance enough for practical use, and a phosphor having a peak wavelength of more than 605 nm and ensuring high luminance sufficient for practical use has not been developed yet.

Patent Document 2 discloses a phosphor exhibiting excellent luminous efficiency and having a fluorescence peak at a wavelength of 595 nm or more, and a production method thereof, where a smooth-surface particle larger than ever before is obtained by adding a previously synthesized α-SiAlON powder as a seed crystal for grain growth to the raw material powder and a powder having a specific particle size is obtained from the synthesized powder without applying a pulverization treatment.

Specifically, an α-SiAlON phosphor which is an α-SiAlON phosphor having a composition of $(Ca_{1.67},Eu_{0.08})$ (Si, Al)$_{12}$(O,N)$_{16}$ [wherein x+y=1.75, O/N=0.03] and in which the peak wavelength of the fluorescence spectrum obtained when excited with blue light of 455 nm is from 599 to 601 nm and the luminous efficiency (=external quantum efficiency=absorptivity×internal quantum efficiency) is from 61 to 63%, is disclosed.

However, in the document above, specific examples of a phosphor having a florescence peak wavelength of more than 601 nm and exhibiting a practicable luminous efficiency are not shown.

Patent Document 3 discloses: a light-emitting device characterized by using a phosphor containing an α-SiAlON as a main component, represented by the formula: $(Ca_\alpha,Eu_\beta)$ $(Si,Al)_{12}(O,N)_{16}$ (provided that $1.5<\alpha+\beta<2.2$, $0<\beta<0.2$ and O/N≤0.04), and having a specific surface area of 0.1 to 0.35 m$^2$/g; a vehicle lighting device using the same; and a headlamp.

The document above discloses working examples of an α-SiAlON phosphor, where the peak wavelengths of the fluorescence spectra obtained when excited with blue light of 455 nm are 592, 598 and 600 nm, and it is reported that the luminous efficiencies (=external quantum efficiency) thereof are 61.0, 62.7, and 63.2%, respectively.

However, in the document above, specific examples of a phosphor having a fluorescence peak wavelength of more than 600 nm and exhibiting a practicable luminous efficiency are not shown.

Patent Document 4 discloses a Ca-containing α-SiAlON phosphor powder represented by the formula: $Ca_xEu_ySi_{12-(m+n)}Al_{(m+n)}O_nN_{16-n}$ (provided that 1.37≤x≤2.60, 0.16≤y≤0.20, 3.6≤m≤5.50, 0≤n≤0.30, and m=2x+3y), which is obtained by firing a mixture of a silicon nitride powder, a europium source and a calcium source in an inert gas atmosphere to previously obtain a Ca-containing α-SiAlON precursor, mixing an aluminum source with the Ca-containing α-SiAlON precursor, again firing the mixture in an inert gas atmosphere to obtain a fired Ca-containing α-SiAlON, and further heat-treating the fired product in an inert gas atmosphere, and a production method thereof.

The document above discloses working examples of a Ca-containing α-SiAlON phosphor in which the peak wavelength of the fluorescence spectrum obtained when excited with blue light of 450 nm is from 602 to 605 nm, and it is reported that the luminous efficiency (=external quantum efficiency) thereof is 54% or more.

However, in the document above, specific examples of a phosphor having a fluorescence peak wavelength of more than 605 nm and exhibiting a practicable luminous efficiency are not shown.

Patent Document 5 discloses a SiAlON phosphor having a specific property of emitting light with high luminance compared to conventional phosphors, which is obtained by firing a metal compound mixture capable of composing a SiAlON phosphor when fired, in a specific temperature range in a gas at a specific pressure, then pulverizing the fired product to a specific particle size, and thereafter subjecting the powder to classification and a heat treatment, and a production method thereof.

However, the matter specifically disclosed in the document above is only the peak luminous intensity and since the peak luminous intensity varies depending on the measuring apparatus and measurement conditions, it is not known whether a luminous intensity high enough for practice use is obtained.

Patent Document 6 describes a Ca—Eu-α-SiAlON represented by the formula: $(Ca_xEu_y)(Si_{12-(m+n)}Al_{m+n})(O_nN_{16-n})$, obtained by partially substituting the Ca site of a Ca-α-SiAlON with $Eu^{2+}$, and it is stated that when the SiAlON phosphor satisfies a configuration where x, y, m and n are in the range of 0.5≤x<2.0, 0<y<0.4, 0.5<x+y<2.0, 1.0≤m<4.0 and y≤n<(x+y) and when the starting material composition of the Ca-α-SiAlON falls in the range between two composition lines of $Si_3N_4$-a(CaO.3AlN)-bEuO and $Si_3N_4$-c($Ca_3N_2$.6AlN)-bEuO, and a, b and c are in the range of 0.5≤a<2.5, 0<b<0.4 and 0.15≤c<0.85, a SiAlON phosphor powder having a peak wavelength of 593 to 620 nm is obtained.

However, the document above merely discloses the peak luminous intensity and since the peak luminous intensity varies depending on the measuring apparatus and measurement conditions, it is not known whether a luminous intensity high enough for practice use is obtained.

RELATED ART

Patent Document

Patent Document 1: Kokai (Japanese Unexamined Patent Publication) No. 2002-363554
Patent Document 2: Kokai No. 2009-96882
Patent Document 3: Kokai No. 2009-96883
Patent Document 4: Kokai No. 2012-224757
Patent Document 5: Kokai No. 2005-008794
Patent Document 6: Kokai No. 2005-307012

SUMMARY OF THE INVENTION

Problems to be Solved by the Invention

For the purpose of improving the color rendering property and luminous efficiency of a white LED or obtaining light emission of orange to red with a desired wavelength, a phosphor having high luminance enough for practical use is demanded, nevertheless, as described above, a highly efficient α-SiAlON phosphor having a broad fluorescence peak wavelength, i.e., a fluorescence peak wavelength of 610 to 625 nm, and being practicable is not known.

An object of the present invention is to provide an (oxy)nitride phosphor powder having a fluorescence peak wavelength of 610 to 625 nm, ensuring that the (oxy)nitride phosphor powder exhibits higher external quantum efficiency than ever before.

Means to Solve the Problems

As a result of intensive studies to attain the above-described object, the present inventors have found that according to an (oxy)nitride phosphor powder containing an α-SiAlON and aluminum nitride, represented by the composition formula:

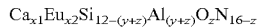

(wherein x1, x2, y and z are 1.60≤x1+x2≤2.90, 0.18≤x2/x1≤0.70, 4.05≤y≤6.5 and 0.0≤z≤1.0), an (oxy)nitride phosphor powder ensuring that a fluorescence in a broad wavelength region having a peak wavelength of 610 to 625 nm is emitted by excitation with light having a wavelength of 450 nm and the external quantum efficiency in the light emission is particularly large, is obtained. The present invention has been accomplished based on this finding.

That is, the present invention relates to an (oxy)nitride phosphor powder containing an α-SiAlON and aluminum nitride, represented by the composition formula:

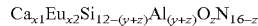

(wherein x1, x2, y and z are 1.60≤x1+x2≤2.90, 0.18≤x2/x1≤0.70, 4.0≤y≤6.5 and 0.0≤z≤1.0).

The present invention relates to the (oxy)nitride phosphor powder above, wherein the content of the aluminum nitride is from more than 0 mass % to less than 33 mass %.

The present invention relates to the (oxy)nitride phosphor powder above, further containing from 50 to 10,000 ppm of Li.

The present invention relates to the (oxy)nitride phosphor powder above, wherein a fluorescence having a peak wavelength in the wavelength region of 610 to 625 nm is emitted by excitation with light having a wavelength of 450 nm and the external quantum efficiency in the light emission is 50% or more.

The present invention relates to the (oxy)nitride phosphor powder above, wherein the 50% diameter (hereinafter, referred to as $D_{50}$) in the particle size distribution curve measured by a laser diffraction/scattering particle size distribution measuring apparatus is from 10.0 to 20.0 m and the specific surface area is from 0.2 to 0.6 m²/g.

In addition, the present invention relates to a crystalline silicon nitride powder used as a raw material for producing an (oxy)nitride phosphor powder containing an α-SiAlON and aluminum nitride and being represented by the composition formula:

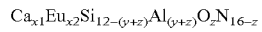

(wherein x1, x2, y and z are 1.60≤x1+x2≤2.90, 0.18≤x2/x1≤0.70, 4.0≤y≤6.5 and 0.0≤z≤1.0), wherein the oxygen content is from 0.2 to 0.9 mass %, the average particle size is from 1.0 to 12.0 μm, and the specific surface area is from 0.2 to 3.0 m²/g.

Furthermore, the present invention relates to a method for producing the (oxy)nitride phosphor powder containing an α-SiAlON and aluminum nitride, comprising a first step of mixing a silicon source substance, an aluminum source substance, a calcium source substance, and a europium source substance to provide a composition represented by the composition formula:

(wherein x1, x2, y and z are 1.60≤x1+x2≤2.90, 0.18≤x2/x1≤0.70, 4.0≤y≤6.5 and 0.0≤z≤1.0), followed by firing at a temperature of 1,500 to 2,000° C. in an inert gas atmosphere, to obtain a fired (oxy)nitride represented by the formula above, and a second step of heat-treating the fired (oxy)nitride.

The present invention relates to the production method of an (oxy)nitride phosphor powder above, wherein the heat treatment in the second step is performed at a temperature of 1,100 to 1,600° C. in an inert gas atmosphere or a reducing atmosphere.

The present invention relates to the production method of an (oxy)nitride phosphor powder above, wherein the heat treatment in the second step is performed in the presence of Li at a temperature of 1,450° C. to less than the firing temperature in an inert gas atmosphere or a reducing atmosphere.

The present invention relates to the production method of an (oxy)nitride phosphor powder above, wherein the silicon source substance is a silicon nitride powder and the silicon nitride powder has an oxygen content of 0.2 to 0.9 mass, an average particle size of 1.0 to 12.0 μm and a specific surface area of 0.2 to 3.0 m²/g.

Effects of the Invention

According to the present invention, provided is an (oxy)nitride phosphor represented by the composition formula:

$$Ca_{x1}Eu_{x2}Si_{12-(y+z)}Al_{(y+z)}O_zN_{16-z}$$

wherein the phosphor is obtained by mixing and firing a silicon source substance, an aluminum source substance, a calcium source substance, and a europium source substance to provide a composition satisfying $1.60 \leq x1+x2 \leq 2.90$, $0.18 \leq x2/x1 \leq 0.70$, $4.0 \leq y \leq 6.5$ and $0.0 \leq z \leq 1.0$, and the phosphor is an (oxy)nitride phosphor powder containing an α-SiAlON and aluminum nitride or an (oxy)nitride phosphor powder containing an α-SiAlON and aluminum nitride and further containing from 50 to 10,000 ppm of Li, whereby a highly efficient (oxy)nitride phosphor powder ensuring that a fluorescence in a broad wavelength region having a peak wavelength of 610 to 625 nm is emitted by excitation with light having a wavelength of 450 nm and the external quantum efficiency in the light emission is particularly large. In addition, according to the present invention, a silicon nitride powder suitably usable for the production of the (oxy)nitride phosphor powder and a production method of the (oxy)nitride phosphor powder are provided.

MODE FOR CARRYING OUT THE INVENTION

Figure 1:
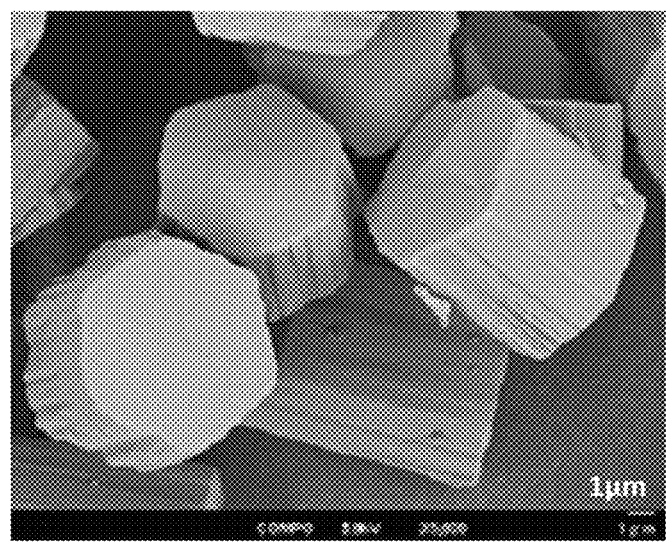
FIG. 1 is a scanning electron micrograph showing a silicon nitride powder for the production of (oxy)nitride phosphor powders of Examples 1 to 19.
Figure 2:
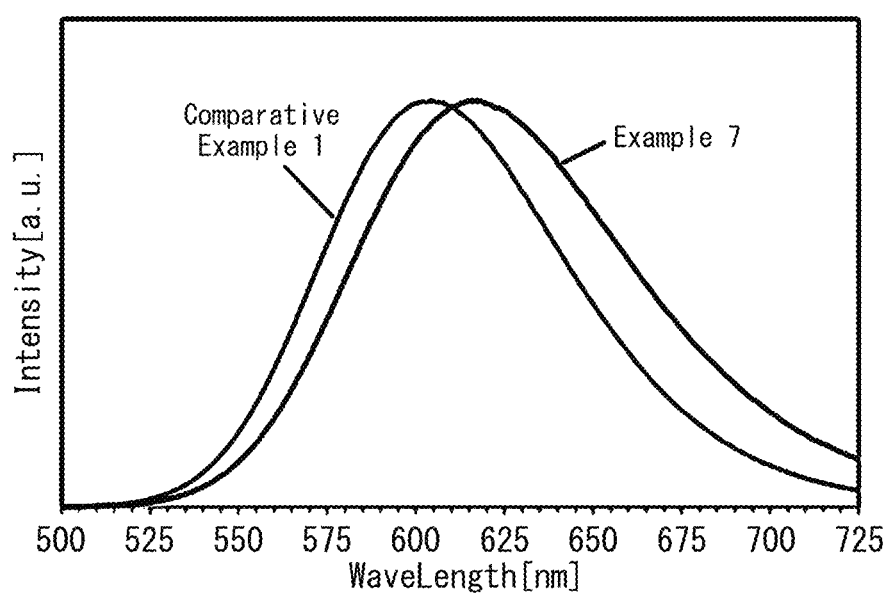
FIG. 2 is a view showing the fluorescence spectra of Example 7 and Comparative Example 1.

The present invention is described in detail below.

In this disclosure, it should be understood that the numerical limitation is provided by taking into account significant figures. For example, the numerical range of 610 to 615 nm means the range of 609.5 to 615.4 nm.

The present invention relates to an (oxy)nitride phosphor powder containing an α-SiAlON and aluminum nitride, where in an (oxy)nitride phosphor represented by the composition formula:

$$Ca_{x1}Eu_{x2}Si_{12-(y+z)}Al_{(y+z)}O_zN_{16-z}$$

the (oxy)nitride phosphor powder satisfies $1.60 \leq x1+x2 \leq 2.90$, $0.18 \leq x2/x1 \leq 0.70$, $4.0 \leq y \leq 6.5$ and $0.0 \leq z \leq 1.0$, so that a fluorescence in a broad wavelength region having a peak wavelength of 610 to 625 nm can be emitted by excitation with light having a wavelength of 450 nm and the external quantum efficiency in the light emission can be particularly large.

An α-SiAlON, particularly, a Ca-containing α-SiAlON, is solid solution where part of Si—N bonds of an α-silicon nitride is substituted by an Al—N bond and an Al—O bond and Ca ions penetrate and are solid-solved in the lattice, thereby keeping electrical neutrality.

In an α-SiAlON phosphor contained in the (oxy)nitride phosphor powder of the present invention, in addition to the Ca ions, Eu ions penetrate into the lattice and are solid solved therein, and the Ca-containing α-SiAlON is thereby activated to provide a phosphor represented by the formula above, which emits yellow to orange fluorescence by excitation with blue light.

A general α-SiAlON phosphor obtained by activation of a rare earth element is, as described in Patent Document 1, represented by $Me_\alpha Si_{12-(m+n)}Al_{(m+n)}O_nN_{16-n}$ (wherein Me is Ca, Mg, Y, or one member or two or more members of lanthanide metals, except for La and Ce), and the metal Me is solid solved in a range from, at the minimum, one per three large unit cells of α-SiAlON each containing four formula weights of $(Si,Al)_3(N,O)_4$ to, at the maximum, one per one unit cell thereof. The solid solubility limit is generally, in the case of a divalent metal element Me, $0.6 < m < 3.0$ and $0 \leq n < 1.5$ in the formula above and, in the case of a trivalent metal Me, $0.9 < m < 4.5$ and $0 \leq n < 1.5$. It is known that outside these ranges, single-phase α-SiAlON is not obtained.

In addition, in order to maintain electrical neutrality when metal Me is solid-solved in the α-SiAlON lattice, part of Si is substituted by Al. The substitution amount is represented by $m = \beta \times \alpha$. The coefficient β in the formula is a numerical value determined from the valence of metal element Me solid-solving in the α-SiAlON phosphor, and α in the formula is a numerical value determined from the amount of metal element Me solid-solved in the α-SiAlON phosphor. In the case where a plurality of metal elements Me are solid-solved in the α-SiAlON phosphor, the substitution amount may be represented, e.g., by $m = \beta 1 \times \alpha 1 + \beta 2 \times \alpha 2$.

With respect to the above-described composition range in which a single-phase α-SiAlON is generally obtained, studies are being made on how fluorescent properties such as emission wavelength vary with a change of m or n in the formula. On the other hand, the composition outside the composition range in which a single-phase α-SiAlON is obtained, and the ratio, etc., of metal element Me solid-solving in the α-SiAlON phosphor have not been sufficiently studied. The present inventors have made intensive studies on the composition of a Ca-containing SiAlON phosphor powder, particularly, the amounts of Ca and Eu solid-solving in the α-SiAlON and the value of m, so as to obtain an α-SiAlON phosphor that emits a fluorescence peak wavelength of 610 nm or more, as a result, it has been found that in a specific composition range, a fluorescence peak wavelength of 610 nm or more is emitted and the luminous efficiency at that time is remarkably enhanced.

The (oxy)nitride phosphor powder of the present invention is specifically described below.

The (oxy)nitride phosphor powder of the present invention is an (oxy)nitride phosphor powder containing an α-SiAlON and aluminum nitride, represented by the composition formula:

$$Ca_{x1}Eu_{x2}Si_{12-(y+z)}Al_{(y+z)}O_zN_{16-z}$$

wherein $1.60 \leq x1+x2 \leq 2.90$, $0.18 \leq x2/x1 \leq 0.70$, $4.0 \leq y \leq 6.5$, and $0.0 \leq z \leq 1.0$.

As described above, x1+x2, that is, a value indicating the amount of Ca ion and Eu ion penetrated and solid-solved in the α-SiAlON, is a value related to y, that is, the Al substitution amount in the α-SiAlON as represented by $y=2x1+3x2$. On the other hand, x2/x1 is a value that can be arbitrarily determined to satisfy $y=2x1+3x2$. However, only a composition region where the amount of Eu present in the α-SiAlON is not more than a certain level has been conventionally studied, because if this amount is increased, reduction in the luminous efficiency, referred to as concentration quenching, occurs or if y, i.e., $2x1+3x2$, is $2x1+3x2\geq4.0$, the composition is not composed of an α-SiAlON alone. In other words, studies have not been made on a composition region satisfying $1.60\leq x1+x2\leq2.90$ and $0.18\leq x2/x1\leq0.70$. The present inventors have found that the ratio of $x2/x1$ greatly affects the emission wavelength of the α-SiAlON and for obtaining an α-SiAlON phosphor having a fluorescence peak wavelength of 610 nm or more, it is important to specify the present invention by $x2/x1$. In addition, it has been found that when the conditions of $1.60\leq x1+x2\leq2.90$ and $0.18\leq x2/x1\leq0.70$ are satisfied, an (oxy)nitride phosphor powder containing an α-SiAlON and aluminum nitride, having a peak wavelength of 610 nm or more and having a high external quantum efficiency, is obtained.

x1 and x2 are values indicating the amounts of Ca ion and Eu ion penetrated and solid-solved in the α-SiAlON, and if $x1+x2$ is less than 1.60 or $x2/x1$ is less than 0.18, the fluorescence peak wavelength becomes shorter than 610 nm. If $x1+x2$ exceeds 2.90 or $x2/x1$ exceeds 0.70, not only the fluorescence intensity is reduced but also the external quantum efficiency falls below 50%.

As described above, y is a value determined for maintaining electrical neutrality when a metal element is solid-solved in the α-SiAlON, and in the (oxy)nitride phosphor powder above, this is represented by $y=2x1+3x2$. The coefficient 2 of x1 in the formula is a numerical value determined from the valence of Ca ion solid-solved in the Ca-containing α-SiAlON phosphor, and the coefficient 3 of x2 in the formula is a numerical value determined from the valence of Eu ion solid-solved in the Ca-containing α-SiAlON phosphor. The (oxy)nitride phosphor powder of the present invention contains aluminum nitride in addition to the α-SiAlON, and y is also a value related to the amount of aluminum nitride produced.

In the present invention, the ranges of y and z are $4.0\leq y\leq6.5$ and $0.0\leq z\leq1.0$. In the case of a composition where y and z are in these ranges, a highly efficient (oxy) nitride phosphor powder ensuring that the fluorescence peak wavelength is from 610 to 625 nm and the external quantum efficiency is 50% or more, is provided.

If y exceeds 6.5, the amount of an aluminum nitride crystal phase produced is too large, and the external quantum efficiency falls below 50%. If y is less than 4.0, the fluorescence peak wavelength becomes shorter than 610 nm and at the same time, the external quantum efficiency falls below 50%. Furthermore, z is a value related to the amount of oxygen substituted and solid-solved in the α-SiAlON. If z exceeds 1, the fluorescence peak wavelength becomes shorter than 610 nm, and if $0\leq y<1.0$ and $0\leq z<1.5$, a β-SiAlON is produced and the external quantum efficiency falls below 50%.

In the present invention, x1, x2, y and z are preferably $1.90\leq x1+x2\leq2.60$, $0.18\leq x2/x1\leq0.50$, $4.6\leq y\leq5.5$ and $0.0\leq z\leq0.20$. In the case of a composition where x1, x2, y and z are in these ranges, an (oxy)nitride phosphor powder having a high external quantum efficiency of 59% or more particularly in a fluorescence peak wavelength range of 610 to 620 nm is provided.

The (oxy)nitride phosphor powder of the present invention, in a preferable embodiment, further contains Li in an amount of 50 to 10,000 ppm, more preferably from 50 to 2,000 ppm, still more preferably from 200 to 1,000 ppm. By containing Li in a specific amount, the external quantum efficiency is more enhanced.

When crystal phases are identified by an X-ray diffractometer (XRD) using CuKα radiation, the (oxy)nitride phosphor powder of the present invention comprises an α-SiAlON crystal phase categorized in the trigonal system and an aluminum nitride crystal phase categorized in the hexagonal system. In the case of containing an appropriate amount of an aluminum nitride crystal phase, the fluorescence peak wavelength tends to be relatively large, and this is preferable. If the amount of the aluminum nitride crystal phase is excessively increased, the external quantum efficiency is reduced. The content of the aluminum nitride crystal phase in the (oxy)nitride phosphor powder is preferably from more than 0 mass % to less than 33 mass %, more preferably 24 mass % or less. In the case of containing an aluminum nitride crystal phase in this range, the fluorescence peak wavelength is shifted to a long wavelength side and at the same time, the external quantum efficiency increases.

Identification and quantification of crystal phase by XRD measurement can be performed using an X-ray pattern analysis software. The analysis software includes, for example, PDXL produced by Rigaku Corporation. Incidentally, the XRD measurement of the (oxy)nitride phosphor powder and the quantification of crystal phase by the Rietveld method were performed using X-ray diffractometer (Ultima IV Protectus) and analysis software (PDXL) produced by Rigaku Corporation.

The Li content (total Li content) in the (oxy)nitride phosphor powder can be quantitatively analyzed using an inductively coupled plasma atomic emission spectrometer (ICP-AES). The (oxy)nitride phosphor powder is decomposed by heating with use of phosphoric acid, perchloric acid, nitric acid and hydrofluoric acid, then added with pure water to make a constant volume, and quantitatively analyzed by ICP-AES, whereby the Li content can be determined.

In a preferable embodiment of the present invention, a heat treatment is performed in the presence of Li after a fired (oxy)nitride phosphor using a Ca-containing α-SiAlON and aluminum nitride is produced, and therefore, Li is present near the surface of the (oxy)nitride phosphor powder. In other words, this element is rarely present in the crystal lattice of the (oxy)nitride phosphor containing a Ca-containing α-SiAlON and aluminum nitride but is present in a large amount on the particle surface.

The amount of Li existing inside of the (oxy)nitride phosphor powder can be determined as follows. The (oxy) nitride phosphor powder is treated in 1N nitric acid for 5 hours to remove the surface layer of the (oxy)nitride phosphor, and the Li content inside of the particle is determined by the ICP-AES qualitative analysis. From the difference between the content determined and the total Li content above, the ratio of the surface Li amount can be calculated according to formula (1):

$$((\text{Total Li content}-\text{Li content inside of particle})/\text{total Li content})\times 100 \qquad \text{formula (1)}$$

In addition, assuming that the (oxy)nitride phosphor powder is a spherical particle, the etching amount (depth) was calculated from the change in weight between before and after the nitric acid treatment above and found to be a thickness of 1 to 100 nm. Accordingly, the amount of Li existing in a region of 1 to 100 nm from the surface can be defined as the surface Li amount. The amount of Li existing near the surface is preferably 50% or more, more preferably 60% or more, of the Li content in the entire phosphor powder. In the present invention, when the amount of Li existing near the surface, i.e., the surface Li content, is 50% or more of the Li content in the entire phosphor powder, an effect of increasing the emission peak wavelength and enhancing the external quantum efficiency is advantageously obtained.

In order to suitably use the (oxy)nitride phosphor powder of the present invention as a phosphor for white LED, it is preferable that $D_{50}$ as the 50% diameter in the particle size distribution curve is from 10.0 to 20.0 μm and the specific surface area is from 0.2 to 0.6 m²/g. Because, if $D_{50}$ is less than 10.0 μm or the specific surface area exceeds 0.6 m²/g, the luminous intensity may be reduced, and if $D_{50}$ exceeds 20.0 μm or the specific surface area is less than 0.2 m²/g, the powder may be hardly dispersed uniformly in the resin encapsulating the phosphor and variation sometimes occurs in the color tone of white LED.

As for the method for controlling the particle size and specific surface area of the (oxy)nitride phosphor powder of the present invention, their control can be achieved by controlling the particle size of the raw material silicon nitride powder. Use of a silicon nitride powder having an average particle size of 1.0 μm or more is preferable, because $D_{50}$ of the (oxy) nitride phosphor powder becomes 10 m or more and at the same time, the specific surface area becomes from 0.2 to 0.6 m²/g, leading to a higher external quantum efficiency.

$D_{50}$ of the (oxy)nitride phosphor powder is a 50% diameter in the particle size distribution curve measured by a laser diffraction/scattering particle size distribution measuring apparatus. In addition, the specific surface area of the (oxy)nitride phosphor powder was measured by a specific surface area measuring apparatus, FlowSorb Model 2300, manufactured by Shimadzu Corporation (BET method by nitrogen gas adsorption).

The (oxy)nitride phosphor powder of the present invention can emit fluorescence having a peak wavelength in the wavelength region of 610 to 625 nm by excitation with light in a wavelength region of 450 nm and at this time, exhibits an external quantum efficiency of 50% or more. Thanks to these capabilities, in the (oxy)nitride phosphor powder of the present invention, long-wavelength orange to red fluorescence can be efficiently obtained by blue excitation light, and furthermore, white light having good color rendering property can be efficiently obtained by the combination with blue light used as excitation light.

The fluorescence peak wavelength can be measured using a solid quantum efficiency measuring apparatus fabricated by combining an integrating sphere with FP-6500 manufactured by JASCO. The fluorescence spectrum correction can be performed using a secondary standard light source, but the fluorescence peak wavelength sometimes slightly varies depending on the measuring device used or correction conditions.

In addition, after measuring the absorptivity and internal quantum efficiency by a solid quantum efficiency measuring apparatus fabricated by combining an integrating sphere with FP-6500 manufactured by JASCO, the external quantum efficiency may also be calculated from the product thereof.

The (oxy)nitride phosphor powder of the present invention can be used as a light-emitting device for various lighting fixtures by combining the powder with a known light-emitting source such as light-emitting diode.

In particular, a light-emitting source capable of emitting excitation light having a peak wavelength of 330 to 500 nm is suitable for the (oxy)nitride phosphor powder of the present invention. The (oxy)nitride phosphor powder exhibits a high luminous efficiency in the ultraviolet region, making it possible to fabricate a light-emitting device having good performance. In addition, the luminous efficiency is high also with a blue light source, and a light-emitting device of good daytime white color or daylight color can be fabricated by the combination of orange to red fluorescence of the (oxy)nitride phosphor powder of the present invention with green and blue excitation light of a green phosphor.

Furthermore, the (oxy)nitride phosphor of the present invention renders an orange to red object color and therefore, can be applied to a coating material, an ink, etc., as an alternative material for a pigment containing a heavy metal such as iron, copper, manganese and chromium, e.g., iron oxide. In addition, the (oxy)nitride phosphor powder can be used as an ultraviolet and/or visible light absorbing material for wide applications.

The production method of the (oxy)nitride phosphor powder containing an α-SiAlON and aluminum nitride of the present invention is specifically described below.

The (oxy)nitride phosphor powder of the present invention is obtained by mixing a silicon source substance, an aluminum source substance, a calcium source substance, and a europium source substance to provide a composition represented by the composition formula:

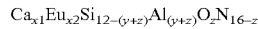

wherein 1.60≤x1+x2≤2.90, 0.18≤x2/x1≤0.70, 4.0≤y≤6.5 and 0.0≤z≤1.0, and firing the mixture at a temperature of 1,500 to 2,000° C. in an inert gas atmosphere.

The fired product obtained is preferably further heat-treated. As the heat treatment, the heat treatment is performed at a temperature of 1,100 to 1,600° C. in an inert gas atmosphere or a reducing gas atmosphere. Alternatively, the heat treatment is performed in the presence of Li at a temperature of 1,450° C. to less than the firing temperature above in an inert gas atmosphere or a reducing gas atmosphere.

The silicon source substance of the raw material is selected from nitride, (oxy)nitride and oxide of silicon and a precursor substance capable of becoming an oxide of silicon by pyrolysis. Among others, crystalline silicon nitride is preferable, and by using crystalline silicon nitride, an (oxy)nitride phosphor powder having high external quantum efficiency can be obtained.

The europium source substance of the raw material is selected from nitride, (oxy)nitride and oxide of europium and a precursor substance capable of becoming an oxide of europium by pyrolysis. Among others, europium nitride (EuN) is preferable. By using EuN, z can be a small numeral, and an (oxy)nitride phosphor powder having a large fluorescence peak wavelength can be obtained.

The calcium source substance of the raw material is selected from nitride, (oxy)nitride and oxide of calcium and a precursor substance capable of becoming an oxide of calcium by pyrolysis. Among others, calcium nitride ($Ca_3N_2$) is preferable. By using $Ca_3N_2$, z can be a small numeral, and an (oxy)nitride phosphor powder having a large fluorescence peak wavelength can be obtained.

The aluminum source substance of the raw material includes aluminum oxide, metal aluminum and aluminum nitride, and respective powders thereof may be used individually or may be used in combination.

The average particle size of the silicon nitride powder as a raw material for the production of the (oxy)nitride phosphor powder of the present invention is preferably from 1.0 to 12.0 μm, more preferably from 3.0 to 12.0 μm. If the average particle size is less than 1.0 μm, the oxygen content tends to increase and the effect of fluorescent properties is reduced. If the average particle size exceeds 12.0 μm, the production is difficult, and this is not practical. Incidentally, the average particle size of the silicon nitride powder was measured from a scanning electron micrograph of the silicon nitride powder. Specifically, a circle was drawn in the scanning electron micrograph, individual particles contacting with the circle were determined for a maximum circle inscribed in the particle, the diameter of the determined circle was taken as the diameter of the particle, and the average particle size of the powder was calculated by averaging the diameters of those particles. The number of particles measured was adjusted to become from about 50 to 150.

The specific surface area of the silicon nitride powder is preferably from 0.2 to 3.0 m$^2$/g, more preferably from 0.2 to 1.0 m$^2$/g. Production of a crystalline silicon nitride powder having a specific surface area of less than 0.2 m$^2$/g is difficult and not practical and causes a problem in device fabrication. If the specific surface area exceeds 3 m$^2$/g, the effect of fluorescent properties is reduced. Therefore, the specific surface area is preferably from 0.2 to 3.0 m$^2$/g. Incidentally, the specific surface area was measured by a specific surface area measuring apparatus, FlowSorb Model 2300, manufactured by Shimadzu Corporation (BET method by nitrogen gas adsorption).

As the silicon nitride powder used for the production of the (oxy)nitride phosphor powder of the present invention, a crystalline silicon nitride powder can be preferably used as described above, and an α-silicon nitride powder is preferable.

In one aspect of the present invention, as the silicon nitride powder used for the production of the (oxy)nitride phosphor powder of the present invention, a crystalline silicon nitride powder and an α-silicon nitride powder, each having a small oxygen content, can be preferably used among others. The oxygen content of the silicon nitride powder as a raw material of the conventional phosphor is from 1.0 to 2.0 mass %, and by using, as a phosphor raw material, a silicon nitride powder having a small oxygen content of 0.2 to 0.9 mass % according to the present invention, an (oxy)nitride phosphor powder exhibiting a higher fluorescence intensity than the conventional α-SiAlON phosphor can be obtained. The oxygen content in the silicon nitride is preferably from 0.2 to 0.8 mass %, more preferably an oxygen amount of 0.2 to 0.4 mass %. Production of silicon nitride having an oxygen amount of less than 0.2 mass % is difficult, and if the oxygen amount exceeds 0.9 mass %, significant enhancement in the fluorescent properties of the (oxy)nitride phosphor powder of the present invention is not achieved. Incidentally, the oxygen content was measured by an oxygen/nitrogen simultaneous analyzer manufactured by LECO.

The silicon nitride powder that can be preferably used for the production of the (oxy)nitride phosphor powder of the present invention can be obtained by thermally decomposing a nitrogen-containing silane compound and/or an amorphous silicon nitride powder. The nitrogen-containing silane compound includes silicon diimide (Si(NH)$_2$), silicon tetraamide, silicon nitrogen imide, silicon chloroimide, etc. These are produced by a known method, for example, a method of reacting a silicon halide such as silicon tetrachloride, silicon tetrabromide or silicon tetraiodide with ammonia in a gas phase, or a method of reacting the silicon halide above in a liquid form with liquid ammonia.

As for the amorphous silicon nitride powder, those produced by a known method, for example, a method of heating and decomposing the nitrogen-containing silane compound above at a temperature of 1,200 to 1,460° C. in a nitrogen or ammonia gas atmosphere, or a method of reacting a silicon halide such as silicon tetrachloride, silicon tetrabromide or silicon tetraiodide with ammonia at a high temperature, are used. The average particle size of the amorphous silicon nitride powder and nitrogen-containing silane compound is usually from 0.003 to 0.05 μm.

The nitrogen-containing silane compound and amorphous silicon nitride powder are readily hydrolyzed or oxidized and therefore, such a raw material powder is weighed in an inert gas atmosphere. In addition, the oxygen concentration in a nitrogen gas flowing into a heating furnace used for heating and decomposing the nitrogen-containing silane compound can be controlled in the range of 0 to 2.0 vol %. An amorphous silicon nitride powder having a low oxygen content is obtained by limiting the oxygen concentration in the atmosphere during decomposition by heating of the nitrogen-containing silane compound, for example, to 100 ppm or less, preferably 10 ppm or less. As the oxygen content of the amorphous silicon nitride powder is lower, the oxygen content of the obtained crystalline silicon nitride particle decreases. Furthermore, the content of metal impurities mixed in the amorphous silicon nitride powder is reduced to 10 ppm or less by a known method where the material of reaction vessel and the rubbing state between powder and metal in a powder handling device are improved.

Subsequently, the nitrogen-containing silane compound and/or amorphous silicon nitride powder are fired at 1,300 to 1,700° C. in a nitrogen or ammonia gas atmosphere to obtain a crystalline silicon nitride powder. The particle size is controlled by controlling the firing conditions (temperature and temperature rise rate). In the present invention, in order to obtain a low-oxygen crystalline silicon nitride powder, oxygen that is simultaneously incorporated into the firing system in a nitrogen gas atmosphere when firing an amorphous silicon nitride powder from a nitrogen-containing silane compound needs to be controlled. In order to obtain a crystalline silicon nitride powder having a large particle size, a slow temperature rise, e.g., at 40° C./h or less is required when firing a crystalline silicon nitride powder from an amorphous silicon nitride powder. In the thus-obtained crystalline silicon nitride powder, as shown in FIG. 1, large primary particles are substantially in a monodisperse state, and an aggregated particle and a fused particle are scarcely formed. The obtained crystalline silicon nitride powder is a high-purity powder having a metal impurity content of 100 ppm or less. In addition, a low-oxygen crystalline silicon nitride powder is obtained by subjecting the crystalline silicon nitride powder above to a chemical treatment such as acid washing. In this way, a silicon nitride powder having an oxygen amount of 0.2 to 0.9 mass % for the production of the (oxy)nitride phosphor powder of the present invention can be obtained.

The thus-obtained silicon nitride powder does not require strong pulverization, unlike silicon nitride produced by direct nitridation of metal silicon, and therefore, is characterized in that the impurity amount is as very small as 100 ppm or less. The amount of impurities (Al, Ca, Fe) contained in the crystalline silicon nitride powder of the present invention is kept at 100 ppm or less, preferably 20 ppm or less, whereby an (oxy)nitride phosphor powder exhibiting a high external quantum efficiency is advantageously obtained.

The above-described silicon nitride powder raw material having a low oxygen content can be preferably used in general for the production of the (oxy)nitride phosphor powder of the present invention and is also useful, among others, for the production of the (oxy)nitride phosphor powder where in the composition formula, x1, x2, y and z are $1.60 \leq x1+x2 \leq 2.90$, $0.18 \leq x2/x1 \leq 0.70$, $4.0 \leq y \leq 6.5$ and $0.0 \leq z \leq 1.0$. In this composition, it is preferable that not only the silicon nitride powder raw material has the above-described low oxygen content but also the average particle size thereof is in the above-described range, i.e., from 1.0 to 12.0 μm, furthermore from 3.0 to 12.0 m, and the specific surface area thereof is from 0.2 to 3.0 m²/g, furthermore from 0.2 to 1.0 m²/g. When the oxygen content, average particle size and specific surface area of the silicon nitride powder raw material are in these ranges, the (oxy)nitride phosphor powder obtained advantageously emits fluorescence where the peak wavelength of fluorescence emitted by excitation with light of a wavelength of 450 nm is in a wavelength region of 610 to 625 nm, and at that time, exhibits an external quantum efficiency of 50% or more.

In addition, the above-described silicon nitride powder raw material having a low oxygen content is useful also for the production of the (oxy)nitride phosphor powder where in the composition formula, x1, x2, y and z are $1.90 \leq x1+x2 \leq 2.60$, $0.18 \leq x2/x1 \leq 0.50$, $4.65 \leq y \leq 5.5$ and $0.0 \leq z \leq 0.20$. In this composition, it is preferable that not only the silicon nitride powder raw material has the above-described low oxygen content but also the average particle size thereof is in the above-described range, i.e., from 1.0 to 12.0 μm, furthermore from 3.0 to 12.0 μm, and the specific surface area thereof is from 0.2 to 3.0 m²/g, furthermore from 0.2 to 1.0 m²/g. When the oxygen content, average particle size and specific surface area of the silicon nitride powder raw material are in these ranges, the (oxy)nitride phosphor powder obtained advantageously emits fluorescence where the peak wavelength of fluorescence emitted by excitation with light of a wavelength of 450 nm is in a wavelength region of 610 to 620 nm, and at that time, exhibits an external quantum efficiency of 59% or more.

In the firing, a Li-containing compound working as a sintering aid is preferably added for the purpose of accelerating the sintering and producing an α-SiAlON crystal phase at a lower temperature. The Li-containing compound used includes lithium oxide, lithium carbonate, metal lithium, and lithium nitride, and respective powders thereof may be used individually or may be used in combination. In particular, when lithium nitride is used, the fluorescence peak wavelength advantageously becomes larger. In addition, the amount of the Li-containing compound added is appropriately from 0.01 to 15.0 mol, in terms of Li element, per mol of the fired (oxy)nitride.

The method for mixing a silicon source substance, a europium source substance, a calcium source substance, and an aluminum source substance is not particularly limited, and a method known per se, for example, a method of dry mixing the substances, or a method of wet mixing the substances in an inert solvent substantially incapable of reacting with each component of the raw material and then removing the solvent, may be employed. As the mixing apparatus, a V-shaped mixer, a rocking mixer, a ball mill, a vibration mill, a medium stirring mill, etc., are suitably used.

A mixture of a silicon source substance, a europium source substance, a calcium source substance, and an aluminum source substance is fired at a temperature of 1,500 to 2,000° C. in an inert gas atmosphere, whereby a fired (oxy)nitride represented by the composition formula above can be obtained. If the firing temperature is less than 1,500° C., the production of α-SiAlON requires heating for a long time and this is not practical. If the temperature exceeds 2,000° C., silicon nitride and α-SiAlON are sublimated and decomposed to produce free silicon, and therefore, an (oxy)nitride phosphor powder exhibiting high external quantum efficiency cannot be obtained. The heating furnace used for firing is not particularly limited as long as firing at 1,500 to 2,000° C. in an inert gas atmosphere can be performed. For example, a batch electric furnace of high frequency induction heating system or resistance heating system, a rotary kiln, a fluidized firing furnace, and a pusher-type electric furnace can be used. As for the crucible that is filled with the mixture, a BN-made crucible, a silicon nitride-made crucible, a graphite-made crucible, and a silicon carbide-made crucible can be used. The fired (oxy)nitride obtained by firing is a powder with little aggregation and good dispersibility.

The fired (oxy)nitride obtained by the firing above may be further heat-treated. By heat-treating the obtained fired (oxy)nitride at a temperature of 1,100 to 1,600° C. in an inert gas atmosphere or a reducing gas atmosphere, an (oxy)nitride phosphor powder exhibiting a particularly high external quantum efficiency when emitting fluorescence having a peak wavelength in a wavelength region of 610 to 625 nm by being excited with light of a wavelength of 450 nm can be obtained. In order to obtain an (oxy)nitride phosphor powder exhibiting higher external quantum efficiency, the heat treatment temperature is preferably from 1,500 to 1,600° C. If the heat treatment temperature is less than 1,100° C. or exceeds 1,600° C., the external quantum efficiency of the obtained (oxy)nitride phosphor powder is reduced. The holding time at a maximum temperature in the case of performing a heat treatment is preferably 0.5 hours or more so as to obtain particularly high external quantum efficiency. Even when the heat treatment is performed for more than 4 hours, the external quantum efficiency is little enhanced for the extension of time or is scarcely changed. Therefore, the holding time at a maximum temperature in the case of performing a heat treatment is preferably from 0.5 to 4 hours.

The heating furnace used for the heat treatment is not particularly limited as long as a heat treatment at a temperature of 1,100 to 1,600° C. in an inert gas atmosphere or a reducing gas atmosphere can be performed. For example, a batch electric furnace of high frequency induction heating system or resistance heating system, a rotary kiln, a fluidized firing furnace, and a pusher-type electric furnace can be used. As for the crucible that is filled with the mixture, a BN-made crucible, a silicon nitride-made crucible, a graphite-made crucible, and a silicon carbide-made crucible can be used.

By performing a heat treatment at a temperature of 1,100 to 1,600° C. in an inert gas atmosphere or a reducing gas atmosphere, the fluorescence peak wavelength of the (oxy)nitride phosphor powder of the present invention is shifted to the long wavelength side by approximately from 0.5 to 2.0 nm, compared with the fired (oxy)nitride before heat treatment, and the external quantum efficiency and the luminous intensity at the fluorescence peak wavelength are enhanced.

The fired (oxy)nitride obtained by the firing above is, in one preferable embodiment, further heat-treated in the presence of Li. By heat-treating the obtained fired (oxy)nitride at a temperature ranging from 1,450° C. to less than the firing temperature above in an inert gas atmosphere or a reducing gas atmosphere, an (oxy)nitride phosphor powder having an Li content of 50 to 10,000 ppm is obtained, and an (oxy)nitride phosphor powder exhibiting a particularly high external quantum efficiency when emitting fluorescence having a peak wavelength in a wavelength region of 610 to 625 nm by being excited with light of a wavelength of 450 nm can be obtained.

The heat treatment in the presence of Li includes, for example, a method of mixing an Li compound with the fired (oxy)nitride as an intermediate and heat-treating the mixture; a method of previously putting an Li compound in a crucible to be used for heat treatment, firing the compound at a temperature of 1,200 to 1,600° C., and heating-treating the fired (oxy)nitride as an intermediate by using the crucible; and a method of simultaneously heat-treating a crucible containing the fired (oxy)nitride and a crucible containing an Li compound in an inert gas atmosphere or a reducing gas atmosphere. The Li compound includes lithium carbonate, lithium oxide, lithium nitride, etc. In the method of mixing an Li compound with the fired (oxy)nitride as an intermediate and heat-treating the mixture, the amount of the Li compound added is suitably from 0.4 to 18.5 g per 100 g of the fired (oxy)nitride. In the method of previously putting an Li compound in a crucible to be used for heat treatment, firing the compound at a temperature of 1,200 to 1,600° C., and heating-treating the fired (oxy)nitride as an intermediate by using the crucible, the amount of the Li compound is suitably from 0.4 to 18.5 g per 100 g of the fired (oxy)nitride.

In order to obtain an (oxy)nitride phosphor powder exhibiting a higher external quantum efficiency, the heat treatment temperature is preferably from 1,450 to 1,600° C. If the heat treatment temperature is less than 1,450° C. or exceeds 1,600° C., the external quantum efficiency of the obtained (oxy)nitride phosphor powder is less improved. The holding time at a maximum temperature in the case of performing heat treatment is preferably 0.5 hours or more so as to obtain particularly high external quantum efficiency. Even when the heat treatment is performed for more than 4 hours, the external quantum efficiency is little enhanced for the extension of time or is scarcely changed. Therefore, the holding time at a maximum temperature in the case of performing heat treatment is preferably from 0.5 to 4 hours.

The heating furnace used for the heat treatment is not particularly limited as long as a heat treatment at a temperature ranging from 1,450° C. to less than the firing temperature above in an inert gas atmosphere or a reducing gas atmosphere can be performed. For example, a batch electric furnace of high frequency induction heating system or resistance heating system, a rotary kiln, a fluidized firing furnace, and a pusher-type electric furnace can be used. As for the crucible that is filled with the mixture, a BN-made crucible, a silicon nitride-made crucible, a graphite-made crucible, and a silicon carbide-made crucible can be used.

One preferable embodiment of the (oxy)nitride phosphor powder of the present invention is a phosphor powder obtained by the production method described above, more specifically, an (oxy)nitride phosphor powder containing an α-SiAlON and aluminum nitride, represented by the composition formula:

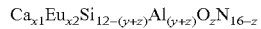

wherein $1.60 \leq x1+x2 \leq 2.90$, $0.18 \leq x2/x1 \leq 0.70$, $4.0 \leq y \leq 6.5$ and $0.0 \leq z \leq 1.0$, which is obtained by mixing a silicon source substance, a europium source substance, a calcium source substance, and an aluminum source substance firing the mixture at a temperature of 1,500 to 2,000° C. in an inert gas atmosphere, and subsequently heat-treating the fired product at a temperature of 1,100 to 1,600° C. in an inert gas atmosphere or a reducing atmosphere.

Another preferable embodiment of the (oxy)nitride phosphor powder of the present invention is a phosphor powder obtained by the production method described above, more specifically, an (oxy)nitride phosphor powder containing α-SiAlON and aluminum nitride, represented by the composition formula:

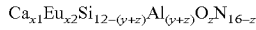

wherein $1.60 \leq x1+x2 \leq 2.90$, $0.18 \leq x2/x1 \leq 0.70$, $4.0 \leq y \leq 6.5$ and $0.0 \leq z \leq 0.0$, and further containing from 50 to 10,000 ppm of Li, which is obtained by mixing a silicon source substance, a europium source substance, a calcium source substance, and an aluminum source substance, firing the mixture at a temperature of 1,500 to 2,000° C. in an inert gas atmosphere, and subsequently heat-treating the fired product in the presence of Li at a temperature of 1,450 to less than the firing temperature above in an inert gas atmosphere or a reducing atmosphere.

EXAMPLES

The present invention is described in greater detail below by referring specific examples.

Example 1

Silicon nitride, europium nitride, aluminum nitride and calcium nitride were weighed in a glove box purged with nitrogen to provide an (oxy)nitride phosphor powder having the designed composition of Table 1 and mixed using a dry vibration mill to obtain a mixed powder. The specific surface area, average particle size and oxygen amount of the silicon nitride powder were 0.3 m²/g, 8.0 μm and 0.29 mass %, respectively. The obtained mixed powder was put in a silicon nitride-made crucible, and the crucible was charged into an electric furnace of graphite resistance heating system. The temperature was raised to 1,725° C. by keeping the atmospheric pressure while flowing nitrogen into the electric furnace and then held at 1,725° C. for 12 hours to obtain a fired (oxy)nitride.

The resulting fired (oxy)nitride was disassociated and classified to obtain a powder having a particle size of 5 to 20 μm, and the obtained powder was put in an alumina crucible. The crucible was charged into an electric furnace of graphite resistance heating system, and the temperature was raised to 1,600° C. by keeping the atmospheric pressure while flowing nitrogen into the electric furnace and then held at 1,600° C. for 1 hour to obtain the (oxy)nitride phosphor powder of the present invention.

$D_{50}$ of the obtained (oxy)nitride phosphor powder was 16.7 μm, and the specific surface area was 0.30 m²/g. $D_{50}$ of the (oxy)nitride phosphor powder of the present invention is a 50% diameter in the particle size distribution curve measured by a laser diffraction/scattering particle size distribution measuring apparatus. In addition, the specific surface area of the (oxy)nitride phosphor powder was measured using a specific surface area measuring apparatus, FlowSorb Model 2300, manufactured by Shimadzu Corporation according to the BET method by nitrogen gas adsorption.

Furthermore, XRD measurement of the obtained (oxy)nitride phosphor powder was performed. The (oxy)nitride phosphor powder was composed of an α-SiAlON crystal phase and an aluminum nitride crystal phase. The contents thereof were 98 mass % and 2 mass %, respectively.

For evaluating the fluorescent properties of the obtained (oxy)nitride phosphor powder, the fluorescence spectrum at an excitation wavelength of 450 nm was measured and at the same time, the absorptivity and internal quantum efficiency were measured, by using a solid quantum efficiency measuring apparatus fabricated by combining an integrating sphere with FP-6500 manufactured by JASCO. The fluorescence peak wavelength and the luminous intensity at that wavelength were derived from the obtained fluorescence spectrum, and the external quantum efficiency was calculated from the absorptivity and the internal quantum efficiency. The relative fluorescence intensity indicative of luminance was defined as a relative value of luminous intensity at the fluorescence peak wavelength when the value of highest intensity of the emission spectrum by the same excitation wavelength of a commercially available YAG:Ce-based phosphor (P46Y3 produced by Kasei Optonix, Ltd.) is taken as 100%. The evaluation results of fluorescent properties of the (oxy)nitride phosphor powder according to Example 1 are shown in Table 2, and the produced crystal phase, content thereof, specific surface area, and $D_{50}$ of the (oxy)nitride phosphor powder are shown in Table 3.

Examples 2 to 16

(Oxy)nitride phosphor powders were obtained by the same method as in Example 1 except that raw material powders according to Examples 2 to 16 were weighed and mixed to provide an (oxy)nitride phosphor powder having the designed composition of Table 1. The fluorescent properties, specific surface area, $D_{50}$, produced crystal phase and content thereof of each of the obtained (oxy)nitride phosphor powders were measured by the same methods as in Example 1, and the results are shown in Tables 2 and 3. In addition, fluorescence spectra of Example 7 and Comparative Example 1 are shown. It is seen that the fluorescence peak wavelength of Example 7 is 615.5 nm and is greatly shifted to the long wavelength side, compared with 604.5 nm of Comparative Example 1.

It is understood from Tables 1 and 2 that in Examples 5 to 7 and 9 to 11 where the (oxy)nitride phosphor powder falls in the range of $1.90 \leq x1+x2 \leq 2.60$, $0.18 \leq x2/x1 \leq 0.50$, $4.6 \leq y \leq 5.5$ and $0.0 \leq z \leq 0.20$ in the formula, the fluorescence peak wavelength is from 610 to 620 nm, i.e., the fluorescence peak wavelength is in a long wavelength region, and at the same time, the external quantum efficiency is as large as 59% or more in particular.

Figure 3:
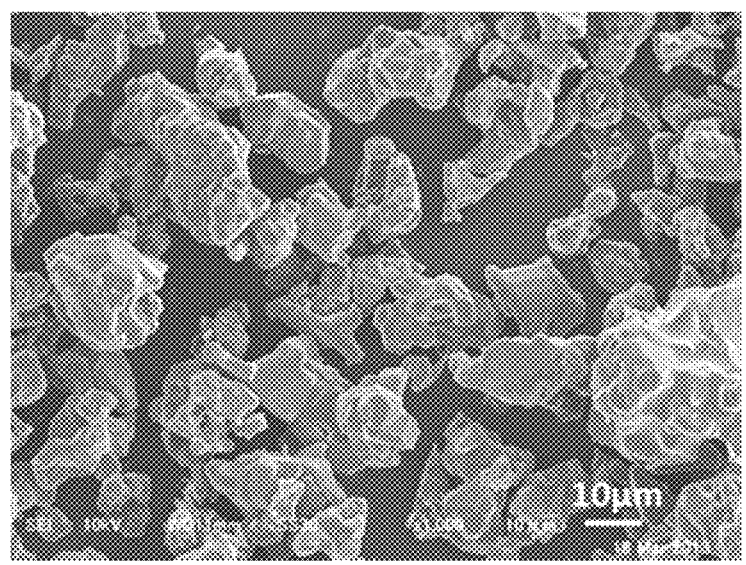
FIG. 3 is a scanning electron micrograph showing the (oxy)nitride phosphor powder of Example 7.
Figure 4:
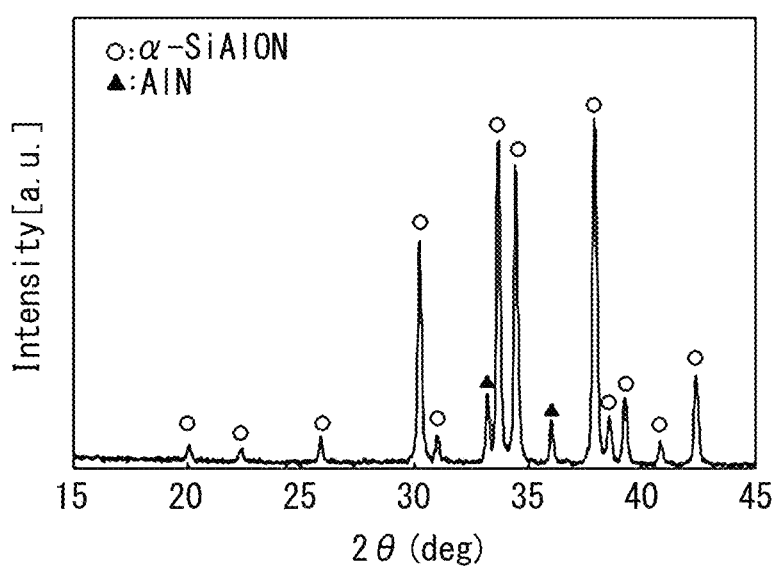
FIG. 4 is a view showing the powder X-ray diffraction pattern of Example 7.

Furthermore, FIG. 3 shows a scanning electron micrograph of the (oxy)nitride phosphor powder of Example 7. It is seen from the Figure that the particle size is relatively uniform and a phosphor powder with little aggregation is obtained. In addition, FIG. 4 shows XRD pattern of Example 7. As apparent from the Figure, the phosphor powder is composed of an α-SiAlON crystal phase and an aluminum nitride crystal phase. The contents of the α-SiAlON crystal phase and the aluminum nitride crystal phase were 92 mass % and 8 mass %, respectively.

Examples 17 to 19

(Oxy)nitride phosphor powders were obtained by the same method as in Example 1, except that silicon nitride, aluminum nitride, aluminum oxide, calcium nitride, calcium carbonate and europium oxide were used as raw material powders to provide an (oxy)nitride phosphor powder having the designed composition of Table 1. Each of the obtained (oxy)nitride phosphor powders was measured for the fluorescent properties, specific surface area, $D_{50}$, produced crystal phase, and content thereof by the same methods as in Example 1, and the results are shown in Tables 2 and 3.

It is understood that in Example 17 where the (oxy)nitride phosphor powder falls in the range of $1.90 \leq x1+x2 \leq 2.60$, $0.18 \leq x2/x1 \leq 0.50$, $4.6 \leq y \leq 5.5$ and $0.0 \leq z \leq 0.20$ in the formula, the fluorescence peak wavelength is from 610 to 620 nm, i.e., the fluorescence peak wavelength is in a long wavelength region, and at the same time, the external quantum efficiency is as large as 59% or more in particular.

Comparative Examples 1 to 7

(Oxy)nitride phosphor powders were obtained by the same method as in Example 1 except that raw material powders according to Comparative Examples 1 to 7 were weighed and mixed to provide an (oxy)nitride phosphor powder having the designed composition of Table 1. Each of the obtained (oxy)nitride phosphor powders was measured for the fluorescent properties, specific surface area, $D_{50}$, produced crystal phase, and content thereof by the same methods as in Example 1, and the results are shown in Tables 2 and 3.

Comparative Examples 8 and 9

(Oxy)nitride phosphor powders were obtained by the same method as in Example 1, except that silicon nitride, aluminum nitride, aluminum oxide, calcium nitride, calcium carbonate and europium oxide were used as raw material powders to provide an (oxy)nitride phosphor powder having the designed composition of Table 1. Each of the obtained (oxy)nitride phosphor powders was measured for the fluorescent properties, specific surface area, $D_{50}$, produced crystal phase, and content thereof by the same methods as in Example 1, and the results are shown in Tables 2 and 3.

Example 20

An (oxy)nitride phosphor powder was obtained by the same method as in Example 7, except that the oxygen amount of the raw material silicon nitride powder was changed to 0.75 mass %. The fluorescent properties, $D_{50}$ and specific surface area of the obtained (oxy)nitride phosphor powder were measured by the same methods as in Example 7, and the results are shown in Table 4. It is seen that in Example 20 where the oxygen amount is 0.75 mass %, the external quantum efficiency is 59.7% and is reduced as compared with the external quantum efficiency of 61.6% after heat treatment of Example 7 where the oxygen amount of the silicon nitride powder is 0.29 mass %.

Examples 21 to 26

(Oxy)nitride phosphor powders were obtained by the same method as in Example 7, except that silicon nitride powders having the specific surface area, average particle size and oxygen amount shown in Table 4 were used as the raw material silicon nitride powder. The fluorescent properties, specific surface area and $D_{50}$ of each of the obtained (oxy)nitride phosphor powders were measured by the same methods as in Example 7, and the results are shown in Table 4. It is seen from Table 4 that when the silicon nitride powder has an oxygen content of 0.2 to 0.9 mass %, an average particle size of 1.0 to 12.0 μm and a specific surface area of 0.2 to 3.0 m²/g or less, among others, the external quantum efficiency is increased.

TABLE 1

|  | x1 | x2 | y | z | x1 + x2 | x2/x1 |
|---|---|---|---|---|---|---|
| Example 1 | 1.571 | 0.286 | 4.00 | 0.00 | 1.857 | 0.182 |
| Example 2 | 1.348 | 0.435 | 4.00 | 0.00 | 1.783 | 0.323 |
| Example 3 | 1.183 | 0.545 | 4.00 | 0.00 | 1.728 | 0.461 |
| Example 4 | 1.026 | 0.650 | 4.00 | 0.00 | 1.676 | 0.633 |
| Example 5 | 1.807 | 0.329 | 4.60 | 0.00 | 2.136 | 0.182 |
| Example 6 | 1.550 | 0.500 | 4.60 | 0.00 | 2.050 | 0.323 |
| Example 7 | 1.360 | 0.627 | 4.60 | 0.00 | 1.987 | 0.461 |
| Example 8 | 1.180 | 0.747 | 4.60 | 0.00 | 1.927 | 0.633 |
| Example 9 | 2.161 | 0.393 | 5.50 | 0.00 | 2.554 | 0.182 |
| Example 10 | 1.853 | 0.598 | 5.50 | 0.00 | 2.451 | 0.323 |
| Example 11 | 1.626 | 0.750 | 5.50 | 0.00 | 2.376 | 0.461 |
| Example 12 | 1.411 | 0.893 | 5.50 | 0.00 | 2.304 | 0.633 |
| Example 13 | 2.554 | 0.464 | 6.50 | 0.00 | 3.018 | 0.182 |
| Example 14 | 2.190 | 0.707 | 6.50 | 0.00 | 2.897 | 0.323 |
| Example 15 | 1.922 | 0.886 | 6.50 | 0.00 | 2.808 | 0.461 |
| Example 16 | 1.667 | 1.056 | 6.50 | 0.00 | 2.723 | 0.633 |
| Example 17 | 1.550 | 0.500 | 4.60 | 0.20 | 2.050 | 0.323 |
| Example 18 | 1.550 | 0.500 | 4.60 | 0.50 | 2.050 | 0.323 |
| Example 19 | 1.550 | 0.500 | 4.60 | 1.00 | 2.050 | 0.323 |
| Comparative Example 1 | 2.000 | 0.200 | 4.60 | 0.00 | 2.200 | 0.100 |
| Comparative Example 2 | 0.950 | 0.900 | 4.60 | 0.00 | 1.850 | 0.947 |
| Comparative Example 3 | 0.900 | 0.933 | 4.60 | 0.00 | 1.833 | 1.037 |
| Comparative Example 4 | 1.280 | 0.413 | 3.80 | 0.00 | 1.693 | 0.323 |
| Comparative Example 5 | 0.975 | 0.617 | 3.80 | 0.00 | 1.592 | 0.633 |
| Comparative Example 6 | 1.796 | 1.137 | 7.00 | 0.00 | 2.932 | 0.633 |
| Comparative Example 7 | 2.359 | 0.761 | 7.00 | 0.00 | 3.120 | 0.323 |
| Comparative Example 8 | 1.807 | 0.329 | 4.60 | 1.10 | 2.136 | 0.182 |
| Comparative Example 9 | 1.807 | 0.329 | 4.60 | 1.50 | 2.136 | 0.182 |

TABLE 2

|  | Peak Wavelength [nm] | Relative Fluorescence Intensity [%] | Absorptivity [%] | External Quantum Efficiency [%] | Internal Quantum Efficiency [%] |
|---|---|---|---|---|---|
| Example 1 | 611.0 | 170 | 84.0 | 55.5 | 66.0 |
| Example 2 | 612.5 | 166 | 83.8 | 54.4 | 64.9 |
| Example 3 | 615.0 | 168 | 84.2 | 54.9 | 65.2 |
| Example 4 | 617.0 | 156 | 85.3 | 51.6 | 60.5 |
| Example 5 | 611.5 | 177 | 84.6 | 59.8 | 70.7 |
| Example 6 | 613.0 | 173 | 85.8 | 60.9 | 71.0 |
| Example 7 | 615.5 | 179 | 86.3 | 61.6 | 71.4 |
| Example 8 | 618.0 | 165 | 86.0 | 54.1 | 62.9 |
| Example 9 | 613.0 | 168 | 85.5 | 59.2 | 69.2 |
| Example 10 | 614.5 | 174 | 86.2 | 59.9 | 69.4 |
| Example 11 | 617.0 | 173 | 86.8 | 59.4 | 68.4 |
| Example 12 | 619.0 | 155 | 84.8 | 51.4 | 60.6 |
| Example 13 | 614.5 | 162 | 84.2 | 54.5 | 64.8 |
| Example 14 | 616.5 | 165 | 86.2 | 55.0 | 63.8 |
| Example 15 | 619.5 | 163 | 85.8 | 53.6 | 62.4 |
| Example 16 | 622.0 | 153 | 86.3 | 50.8 | 58.9 |
| Example 17 | 612.5 | 179 | 85.7 | 60.4 | 70.5 |
| Example 18 | 611.0 | 170 | 84.1 | 55.5 | 66.0 |
| Example 19 | 610.5 | 166 | 83.2 | 54.4 | 65.4 |
| Comparative Example 1 | 604.0 | 212 | 87.2 | 65.1 | 74.7 |
| Comparative Example 2 | 621.0 | 139 | 87.2 | 48.7 | 55.8 |
| Comparative Example 3 | 623.5 | 88 | 71.2 | 33.3 | 46.7 |
| Comparative Example 4 | 616.0 | 135 | 77.4 | 45.9 | 59.2 |
| Comparative Example 5 | 610.5 | 131 | 72.7 | 45.3 | 62.3 |
| Comparative Example 6 | 624.0 | 98 | 72.7 | 35.8 | 49.3 |
| Comparative Example 7 | 619.5 | 135 | 72.7 | 45.9 | 63.1 |
| Comparative Example 8 | 604.5 | 159 | 70.9 | 52.8 | 74.5 |
| Comparative Example 9 | 602.0 | 157 | 77.2 | 52.0 | 67.4 |

TABLE 3

|  | Crystal Phase | Content of Crystal Phase [mass %] α-SiAlON | Content of Crystal Phase [mass %] AlN | Specific Surface Area [m²/g] | $D_{50}$ [μm] |
|---|---|---|---|---|---|
| Example 1 | α-SiAlON + AlN | 98 | 2 | 0.30 | 16.7 |
| Example 2 | α-SiAlON + AlN | 97 | 3 | 0.29 | 17.2 |
| Example 3 | α-SiAlON + AlN | 95 | 5 | 0.32 | 15.8 |
| Example 4 | α-SiAlON + AlN | 96 | 4 | 0.31 | 15.3 |
| Example 5 | α-SiAlON + AlN | 94 | 6 | 0.31 | 16.3 |
| Example 6 | α-SiAlON + AlN | 94 | 6 | 0.30 | 16.7 |
| Example 7 | α-SiAlON + AlN | 92 | 8 | 0.32 | 16.0 |
| Example 8 | α-SiAlON + AlN | 91 | 9 | 0.29 | 15.6 |
| Example 9 | α-SiAlON + AlN | 78 | 22 | 0.29 | 17.2 |
| Example 10 | α-SiAlON + AlN | 76 | 24 | 0.31 | 16.2 |
| Example 11 | α-SiAlON + AlN | 77 | 23 | 0.33 | 15.4 |
| Example 12 | α-SiAlON + AlN | 72 | 28 | 0.31 | 16.3 |
| Example 13 | α-SiAlON + AlN | 70 | 30 | 0.31 | 16.0 |
| Example 14 | α-SiAlON + AlN | 68 | 32 | 0.26 | 15.4 |
| Example 15 | α-SiAlON + AlN | 69 | 31 | 0.31 | 16.0 |
| Example 16 | α-SiAlON + AlN | 68 | 32 | 0.33 | 13.2 |
| Example 17 | α-SiAlON + AlN | 93 | 7 | 0.26 | 18.2 |
| Example 18 | α-SiAlON + AlN | 90 | 10 | 0.30 | 16.8 |
| Example 19 | α-SiAlON + AlN | 89 | 11 | 0.30 | 17.1 |
| Comparative Example 1 | α-SiAlON + AlN | 93 | 7 | 0.34 | 12.8 |
| Comparative Example 2 | α-SiAlON + AlN | 89 | 11 | 0.27 | 18.0 |
| Comparative Example 3 | α-SiAlON + AlN | 87 | 13 | 0.28 | 17.7 |
| Comparative Example 4 | α-SiAlON | 100 | — | 0.31 | 14.6 |
| Comparative Example 5 | α-SiAlON | 100 | — | 0.29 | 15.1 |
| Comparative Example 6 | α-SiAlON + AlN | 65 | 35 | 0.26 | 18.2 |
| Comparative Example 7 | α-SiAlON + AlN | 67 | 33 | 0.29 | 15.1 |
| Comparative Example 8 | α-SiAlON + AlN | 89 | 11 | 0.32 | 13.9 |
| Comparative Example 9 | α-SiAlON + AlN | 86 | 14 | 0.28 | 15.7 |

TABLE 4

| | Silicon Nitride Powder (raw material) | | | Fluorescent Properties (before heat treatment) | | | | |
|---|---|---|---|---|---|---|---|---|
| | Specific Surface Area [m²/g] | Average Particle Size [μm] | Oxygen Amount [mass %] | Peak Wavelength [nm] | Relative Fluorescence Intensity [%] | Absorptivity [%] | External Quantum Efficiency [%] | Internal Quantum Efficiency [%] |
| Example 7 | 0.3 | 8.0 | 0.29 | 615.0 | 112 | 85.3 | 39.1 | 45.9 |
| Example 20 | 0.3 | 8.0 | 0.75 | 614.5 | 108 | 83.3 | 38.4 | 46.1 |
| Example 21 | 1.0 | 3.0 | 0.34 | 614.0 | 110 | 84.3 | 36.8 | 43.6 |
| Example 22 | 1.0 | 3.0 | 0.72 | 613.5 | 105 | 83.3 | 30.5 | 36.6 |
| Example 23 | 2.5 | 1.5 | 0.53 | 614.0 | 102 | 84.1 | 36.4 | 43.3 |
| Example 24 | 2.5 | 1.5 | 0.73 | 612.5 | 104 | 83.2 | 36.0 | 43.3 |
| Example 25 | 10 | 0.2 | 0.89 | 613.5 | 99 | 83.9 | 34.9 | 41.6 |
| Example 26 | 10 | 0.2 | 1.12 | 613.0 | 100 | 82.7 | 34.1 | 41.2 |

| | Fluorescent Properties (after heat treatment) | | | | | Oxynitride Phosphor Powder | |
|---|---|---|---|---|---|---|---|
| | Peak Wavelength [nm] | Relative Fluorescence Intensity [%] | Absorptivity [%] | External Quantum Efficiency [%] | Internal Quantum Efficiency [%] | Specific Surface Area [m²/g] | $D_{50}$ [μm] |
| Example 7 | 615.5 | 179 | 86.3 | 61.6 | 71.4 | 0.32 | 16.0 |
| Example 20 | 615.0 | 173 | 86.4 | 59.27 | 69.1 | 0.27 | 16.2 |
| Example 21 | 615.0 | 176 | 85.4 | 61.3 | 71.8 | 0.29 | 15.7 |
| Example 22 | 614.5 | 170 | 85.0 | 59.2 | 69.7 | 0.32 | 14.3 |
| Example 23 | 615.0 | 171 | 84.6 | 60.6 | 71.6 | 0.29 | 15.2 |
| Example 24 | 614.5 | 166 | 84.3 | 59.0 | 70.0 | 0.31 | 15.6 |
| Example 25 | 614.0 | 167 | 82.8 | 56.7 | 68.4 | 0.34 | 13.1 |
| Example 26 | 614.0 | 161 | 82.4 | 55.1 | 66.9 | 0.32 | 13.8 |

Examples 27 to 33

Fired (oxy)nitrides were produced by the same method as in Example 7. The resulting fired (oxy)nitride was disassociated and classified to obtain a powder having a particle size of 5 to 20 m. Then, $Li_2O$ was added in an amount shown in Table 5 per 100 g of the obtained powder and mixed in a mortar. The mixture was put in an alumina crucible, and the crucible was charged into an electric furnace of graphite resistance heating system. The temperature was raised to 1,600° C. by keeping the atmospheric pressure while flowing nitrogen into the electric furnace and then held at 1,600° C. for 1 hour to obtain an (oxy)nitride phosphor composed of an Li-containing α-SiAlON phosphor.

The Li content of the obtained (oxy)nitride phosphor powder was measured by ICP-AES analysis. The amount of Li contained in the (oxy)nitride phosphor powder is shown in Table 5. As seen from Table 5, the Li content is preferably from 50 to 2,000 ppm, because the external quantum efficiency is more enhanced.

The invention claimed is:

1. An (oxy)nitride phosphor powder containing an α-SiAlON crystal phase and aluminum nitride crystal phase, represented by the composition formula:

$$Ca_{x1}Eu_{x2}Si_{12-(y+z)}Al_{(y+z)}O_zN_{16-z}$$

wherein x1, x2, y and z are 1.60≤x1+x2≤2.90, 0.18≤x2/x1≤0.70, 4.0≤y≤6.5 and 0.0≤z≤1.0.

2. The (oxy)nitride phosphor powder according to claim 1, wherein the content of aluminum nitride crystal phase is from more than 0 mass % to less than 33 mass %.

3. The (oxy)nitride phosphor powder according to claim 1, further containing from 50 to 10,000 ppm of Li.

4. The (oxy)nitride phosphor powder according to claim 1, wherein a fluorescence having a peak wavelength in a wavelength region of 610 to 625 nm is emitted by excitation with light having a wavelength of 450 nm and an external quantum efficiency in the light emission is 50% or more.

5. The (oxy)nitride phosphor powder according to claim 1, wherein a 50% diameter ($D_{50}$) in a particle size distribu-

TABLE 5

| | Li | | Fluorescent Properties (after heat treatment) | | | | |
|---|---|---|---|---|---|---|---|
| | Amount of $Li_2O$ Added[*1] [g] | Content (after heat treatment) [ppm] | Peak Wavelength [nm] | Relative Fluorescence Intensity [%] | Absorptivity [%] | External Quantum Efficiency [%] | Internal Quantum Efficiency [%] |
| Example 7 | — | <10 | 615.5 | 179 | 86.3 | 61.6 | 71.4 |
| Example 27 | 0.10 | 79 | 615.0 | 181 | 86.4 | 61.7 | 71.4 |
| Example 28 | 0.20 | 128 | 615.5 | 184 | 86.6 | 62.5 | 72.1 |
| Example 29 | 0.45 | 232 | 616.0 | 188 | 86.5 | 63.2 | 73.1 |
| Example 30 | 1.35 | 588 | 615.0 | 192 | 86.8 | 64.0 | 73.7 |
| Example 31 | 2.03 | 987 | 615.5 | 195 | 86.1 | 64.7 | 75.2 |
| Example 32 | 3.86 | 1985 | 615.0 | 184 | 86.4 | 62.5 | 72.3 |
| Example 33 | 6.08 | 3083 | 615.0 | 165 | 86.5 | 58.3 | 67.4 |

[*1]The amount of $Li_2O$ added per 100 g of fired oxynitride.

tion curve measured by a laser diffraction/scattering particle size distribution measuring apparatus is 10.0 to 20.0 μm and specific surface area is 0.2 to 0.6 m²/g.

6. A method of producing the (oxy)nitride phosphor powder according to claim 1, comprising:
  a first step of mixing a silicon source substance, an aluminum source substance, a calcium source substance, and a europium source substance to provide a composition represented by the composition formula:

$Ca_{x1}Eu_{x2}Si_{12-(y+z)}Al_{(y+z)}O_zN_{16-z}$ wherein x1, x2, y and z are
  $1.60 \leq x1+x2 \leq 2.90$,
  $0.18 \leq x2/x1 \leq 0.70$,
  $4.0 \leq y \leq 6.5$,
  $0.0 \leq z \leq 1.0$, followed by firing at a temperature of 1,500 to 2,000° C. in an inert gas atmosphere to obtain a fired (oxy)nitride represented by the formula above, and
  a second step of heat-treating the fired (oxy)nitride, wherein the heat treatment in the second step is performed at a temperature of 1,100 to 1,600° C. in an inert gas atmosphere or a reducing atmosphere.

7. A method of producing the (oxy)nitride phosphor powder according to claim 1, comprising:
  a first step of mixing a silicon source substance, an aluminum source substance, a calcium source substance, and a europium source substance to provide a composition represented by the composition formula:

$Ca_{x1}Eu_{x2}Si_{12-(y+z)}Al_{(y+z)}O_zN_{16-z}$ wherein x1, x2, y and z are
  $1.60 \leq x1+x2 \leq 2.90$,
  $0.18 \leq x2/x1 \leq 0.70$,
  $4.0 \leq y \leq 6.5$,
  $0.0 \leq z \leq 1.0$, followed by firing at a temperature of 1,500 to 2,000° C. in an inert gas atmosphere to obtain a fired (oxy)nitride represented by the formula above, and
  a second step of heat-treating the fired (oxy)nitride, wherein the heat treatment in the second step is performed in the presence of Li at a temperature of 1,450° C. to less than the firing temperature in an inert gas atmosphere or a reducing atmosphere.

8. The method according to claim 6, wherein the silicon source substance is a silicon nitride powder and the silicon nitride powder has an oxygen content of 0.2 to 0.9 mass %, an average particle size of 1.0 to 12.0 μm and a specific surface area of 0.2 to 3.0 m²/g.

9. The method according to claim 7, wherein the silicon source substance is a silicon nitride powder and the silicon nitride powder has an oxygen content of 0.2 to 0.9 mass %, an average particle size of 1.0 to 12.0 μm and a specific surface area of 0.2 to 3.0 m²/g.

* * * * *